(12) United States Patent
Audette

(10) Patent No.: US 7,014,809 B2
(45) Date of Patent: Mar. 21, 2006

(54) PROCESS FOR MAKING A REUSABLE SOFT BAG FOR USE IN INFUSION PROCESSES FOR MAKING PLASTIC PARTS

(76) Inventor: Lawrence F. Audette, P. O.Box 399, Hutto, TX (US) 38634-0399

( * ) Notice: Subject to any disclaimer, the term of this patent is extended or adjusted under 35 U.S.C. 154(b) by 0 days.

(21) Appl. No.: 10/902,983

(22) Filed: Jul. 30, 2004

(65) Prior Publication Data

US 2006/0022380 A1    Feb. 2, 2006

(51) Int. Cl.
*B29C 41/08* (2006.01)
(52) U.S. Cl. ...................... 264/257; 264/309; 264/324; 264/510; 264/511; 425/388
(58) Field of Classification Search ........ 264/257–259, 264/299–301, 309, 324, 510, 511; 425/388–390
See application file for complete search history.

(56) References Cited

U.S. PATENT DOCUMENTS

| | | | |
|---|---|---|---|
| 3,344,007 A | | 9/1967 | Skoggard |
| 3,410,936 A | | 11/1968 | Juras |
| 4,201,823 A | | 5/1980 | Russell |
| 4,822,549 A | | 4/1989 | Verwilst et al. |
| 5,316,462 A | * | 5/1994 | Seemann ............... 425/112 |
| 5,433,165 A | | 7/1995 | McGuiness et al. |
| 5,526,767 A | | 6/1996 | McGuiness |
| 5,624,512 A | * | 4/1997 | Boszor ................. 156/87 |
| 5,665,301 A | | 9/1997 | Alanko |
| 5,837,185 A | | 11/1998 | Livesay et al. |
| 5,853,650 A | | 12/1998 | Lonno et al. |
| 5,939,013 A | | 8/1999 | Han et al. |
| 6,086,813 A | | 7/2000 | Gruenwald |
| 6,723,273 B1 | | 4/2004 | Johnson et al. |
| 2003/0102596 A1 | | 6/2003 | Miller |
| 2003/0102604 A1 | | 6/2003 | Mack et al. |
| 2004/0046291 A1 | | 3/2004 | Johnson et al. |

FOREIGN PATENT DOCUMENTS

CA           2435713          1/2004

(Continued)

OTHER PUBLICATIONS

Aerovac Systems Ltd., "Infusion Range", Dec. 2001, 1st edition, p. 1-10, (2001).

*Primary Examiner*—Stefan Staicovici
(74) *Attorney, Agent, or Firm*—Dennis G. LaPointe

(57) ABSTRACT

An improvement to a process for making a reusable soft flexible bag for use in infusion processes for making plastic parts, wherein a reusable polymer bag is formed by spraying or swirl spraying one or multiple layers or coats of a polymer made from one or plural component polymer material, to create a desired configuration of the bag. Successive coats can be applied without waiting for the previous layer to be cured. The bag once completely cured can be removed from the original pattern from which it was configured and placed into the resin infusion process on the same opposing mold for multiple uses before exhausting the life of the bag. Resin ports and vacuum ports and where necessary molding in handles can be included or formed during the spray process to allow for easy removal from one part and transference to a new part to be molded.

3 Claims, 2 Drawing Sheets

FOREIGN PATENT DOCUMENTS

| | | |
|---|---|---|
| EP | 1 361 040 A1 | 11/2003 |
| FR | 2817792 | 6/2004 |
| JP | 8323872 | 12/1996 |
| JP | 9300476 | 11/1997 |
| JP | 2000343617 | 12/2000 |
| JP | 2001315216 | 11/2001 |
| JP | 2002144440 | 5/2002 |
| JP | 2000094533 | 4/2004 |

* cited by examiner

PROCESS FOR MAKING A REUSABLE SOFT BAG FOR USE IN INFUSION PROCESSES FOR MAKING PLASTIC PARTS

FIELD OF THE INVENTION

The invention relates to a method of creating a reusable soft flexible polymer bag or skin utilizing a spray or swirl spray application of a sprayable polymer, where the bag or skin is used as a bagging material to be used in a resin transfer process (infusion or vacuum bagging process) for making polymer parts, such as fiberglass reinforced plastic parts.

BACKGROUND OF THE INVENTION

Creating closed molds using bags (skins) for use in resin infusion of fiberglass reinforced plastic parts is not new. The use of single use and multi-use bags (skins) have been used on a limited basis in the manufacture of fiber reinforcement plastic parts for years. However, the use of single use bags is cost prohibitive from a labor and material standpoint due to the costs associated with having to purchase, fabricate and fit each bag for every part manufactured.

In addition, the lack of the bag's flexibility in being able to conform to difficult geometries make single use bags even more prohibitive. U.S. Pat. No. 6,086,813 to Gruenwald discloses the use of a preformed vacuum bag, but the drawback of this disclosure is in the care that must be taken for the bag to conform to contours, is labor intensive and having to dispose of the waste bag is costly.

U.S. Pat. No. 5,665,301 to Alanko discusses the use of a unitary reusable vacuum bag and the advantages of a reusable bag over single use bags. This patent also makes reference to U.S. Pat. No. 5,316,462 to Seemann and U.S. Pat. No. 5,087,193 to Hebert, wherein both refer to the use of polymers (in this case silicone) to create multi-use reusable bags, but both also have significant drawbacks due to the large amounts of labor requirements in making the bags and in adapting the bag to different geometries associated with the infusion process.

U.S. Pat. No. 6,723,273 to Johnson et al. references the process of creating a bag or skin using a spray process, but in the process, the bag created becomes part of the finished product and is not reusable as in the process of the present invention.

Therefore one object of the present invention is to provide an improved process in significantly reducing labor in the creation of a reusable soft flexible vacuum bag, that improvement being using a sprayable material to form the bag or skin.

Flexible polymer reusable molding systems have historically been manufactured by either:

Cutting of cured sheets of flexible material, and if necessary gluing cut sheet material pieces to make the end product conform to the geometry of the part to be manufactured. Cured sheets are often manufactured by a third party offsite of the eventual usage location, but could in some instances be done on site, manufactured by pouring a liquid polymer into a sheet form allowing the material to cure in the sheet form prior to the cutting and if necessary the gluing process; or In more recent processes involving the use of a liquid polymer, dispensed by pouring the liquid polymer directly to the geometric surface to, when cured, forms a flexible sheet referenced in the above alternative method. The liquid polymer, consisting of either one or two components, is dispensed to the intended surface and manually spread around and over the surface to form a thin film coat, by using either a spatula, a brush or some other trowel method. Dispensing the liquid polymer directly to create this product surface requires many hours to manually trowel multiple layers of polymer to create the functionality of the sheet material. The application by troweling for spreading the poured liquid polymer to make a film requires multiple coats, each of which must have adequate "cured film thickness" before a successive coat can be applied. The application of a second, third, or more coats prior to the previous coat having achieved an adequate cured film thickness can require hours before a successive coat can be applied causing the entire process to take a day or more to complete. To trowel or spread an application of a successive coat prior to a previous coat reaching adequate cured film thickness would cause the previous filmed coat to tear caused by the dragging of the successive coat over the previous uncured coat. This tearing would be similar to that seen when applying a second coat of paint over a previous coat of paint before the first coat is adequately dried. To trowel or spread an application is very labor intensive and time consuming.

SUMMARY OF THE INVENTION

The invention is an improvement to a process for making a reusable soft flexible bag for use in infusion (vacuum bag) processes for making plastic parts, wherein a reusable polymer bag is formed by spraying or swirl spraying one or multiple layers or coats of a polymer made from one or plural component polymer material, to allow for the creation of both simple and complex contours to obtain the desired configuration of the bag. Means 20 for spraying or swirl spraying is representational shown in FIG. 1 as a spray gun. Industrial sprayers are known in the art. Successive coats can be spray applied without waiting for the previous layer to have a sufficient dry film thickness, cured or tact-free, that is, without waiting for the previous sprayed layer to reach some degree of curedness. The bag once completely cured can be removed from the original pattern from which it was configured and placed into the resin infusion process on the same opposing mold for multiple uses before exhausting the life of the bag.

The one or plural component polymer material is a composition or mixture having a viscosity and thixotrophy such that it can be sprayed through the nozzle orifice and hoses of industrial spray equipment.

Resin ports, vacuum ports and where necessary, molding in of handles can be included or formed in during the spray process to allow for easy removal from one part and transference to a new part to be molded.

The improved process further comprises adding means for reinforcing the formed bag between any two successively applied coats of the sprayable polymer material. Examples of such means can be in the form of a mesh or netting material, for example nylon or fiberglass, which is applied over the surface of one of the applied coats before subsequent coats are applied.

BRIEF DESCRIPTION OF THE DRAWINGS

Referring to the accompanying drawings.

DETAILED DESCRIPTION OF THE INVENTION

Figure 1:
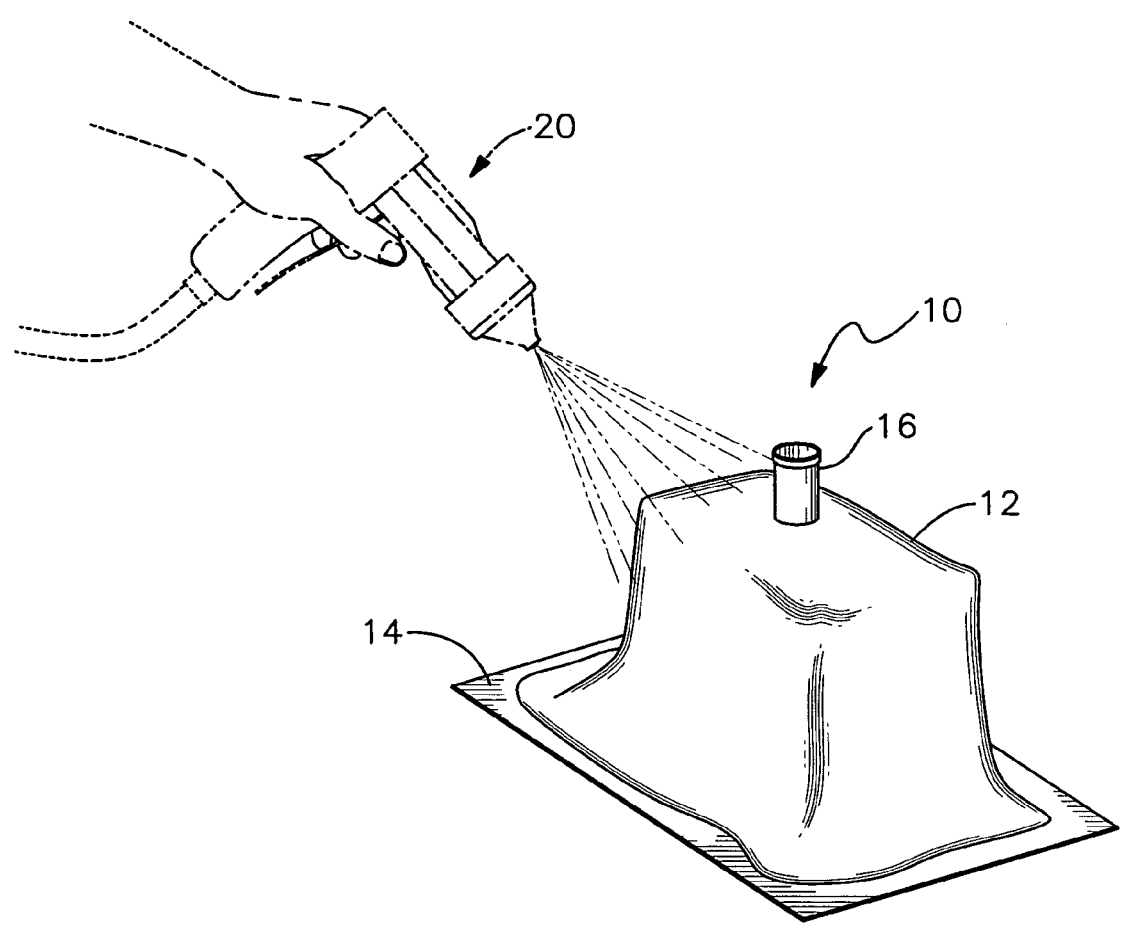
FIG. 1 is a schematic representation of the improved process invention depicting another coat or layer being applied to form a soft bag over the hard mold.
Figure 2:
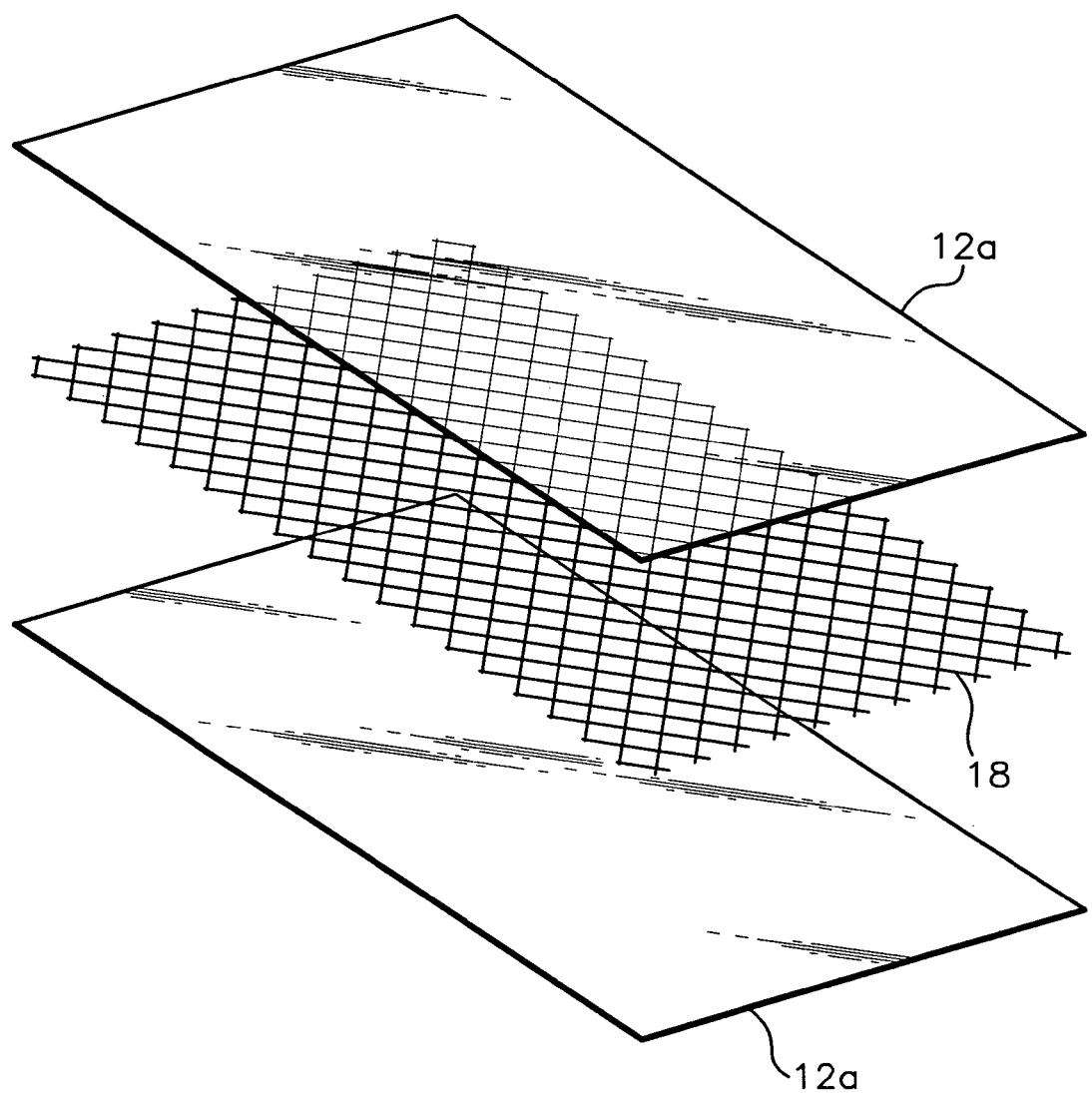
FIG. 2 is an exploded view representing two sprayed coatings with a reinforcement mesh sandwiched in between each coat.

Referring now to the drawings, FIGS. 1 and 2, are schematic representations of the concept of the inventive process.

The inventive process, represented generally by the reference numeral 10, is an improvement in a process for making a soft flexible bag 12 for use in infusion or vacuum bag processes for making plastic parts, fiberglass reinforced plastic parts and other polymer-based parts, wherein the flexible polymer bag 12 is formed for use as a soft mold or other manufacturing aid in conjunction with an opposing mold 14, in between which a resinous material is directed using vacuum means to form the desired part, the improved process comprising making a flexible polymer bag 12 by spraying or swirl spraying one or more coats (12a) of a sprayable polymer material made from one or plural component polymer material over an opposing mold 14 to form a desired configuration of the bag, wherein the opposing mold 14 serves as a pattern from which the formed bag 12 is configured, and wherein the formed bag 12 is reusable for making the desired part.

Although it is contemplated within the scope of the invention that one coat 12a may be sprayed to form a bag 12, in most industrial applications, successive coats 12a of the sprayable polymer material are applied. As discussed above, the benefit of using a spraying technique for applying the polymer material is that successive coats 12a may be applied before a previously applied coat 12a is tact-free, cured or have developed adequate cured film thickness. Secondly, the benefit of a spray technique is significantly less labor time involved in spraying the material versus the hand troweling.

The polymer material may typically include silicone materials. Spraying the polymer allows for the sprayed polymer to more accurately adapt to the exact contours of the hard mold or opposing mold 14, thereby allowing for the making of parts according to intended contour designs or shapes.

Although ports 16 for delivering the resin and for attaching vacuum means during the eventual infusion process can be inserted later by gluing the ports 16 in place, the ports 16 may be located and integrally made part of the bag 12 during the spray process. Only one port 16 is shown in FIG. 1 to represent the concept of including a port while forming the bag 12. Typically a second port 16 would be located near the perimeter of the formed bag 12 at a location to suit the infusion or vacuum bagging process, that is, to draw the resin in such a way as to form the part being made.

The opposing mold 14 is a hard mold upon which the formed bag 12 is placed for the eventual completion of the infusion or vacuum process to make the desired part. As shown in FIG. 2 representationally, means 18 for reinforcing the formed bag 12 may be added between any two successively applied coats 12a of the sprayable polymer material. This may be in the form of a net or mesh configured material that may be made from fiberglass, nylon or other composites. It also can be applied to a coat 12a without having to wait for the coat 12a to be cured or tact-free.

It should be understood that the preceding is merely a detailed description of one or more embodiments of this invention and that numerous changes to the disclosed embodiments can be made in accordance with the disclosure herein without departing from the spirit and scope of the invention. The preceding description, therefore, is not meant to limit the scope of the invention. Rather, the scope of the invention is to be determined only by the appended claims and their equivalents.

The invention claimed is:

1. A process for making a reusable soft flexible bag for use in infusion or vacuum bag processes to be used in the manufacturing of plastic parts for use in the marine fiberglass industry, in a non-autoclave environment and where static pressure is not required, the process comprising:

making a reusable flexible polymer bag by spraying or swirl spraying one or more coats of a polymer material made from one or plural component polymer on a surface of an opposing mold serving as a pattern from which the formed bag is configured, wherein successive coats of the sprayable silicone material are applied once a previously applied coat becomes sufficiently tack-free so as to not cause tearing of the previously applied coat during the spraying of the successive coat, inserting of resin ports and vacuum ports where desired; and curing said sprayed silicone material under ambient conditions when a desired number of the one or more coats of the silicone material are applied;

wherein the cured formed soft reusable flexible bag is configured so as to be used in conjunction with a more rigid mold or other manufacturing aid, in between which a resinous material is directed using vacuum means to draw the resinous material in between the bag and the more rigid mold using the inserted resin ports and vacuum ports, to form the desired part, and wherein the formed bag is reusable for making the desired part.

2. The improvement according to claim 1, wherein the opposing mold is a more rigid mold upon which the formed bag is placed for the eventual completion of the infusion or vacuum process to make the desired part.

3. The improvement according to claim 1, further comprising:

adding means for reinforcing the formed bag between any two successively applied coats of the sprayable silicone material.

* * * * *

UNITED STATES PATENT AND TRADEMARK OFFICE
CERTIFICATE OF CORRECTION

PATENT NO. : 7,014,809 B2 Page 1 of 1
DATED : March 21, 2006
INVENTOR(S) : Lawrence F. Audette It is certified that error appears in the above-identified patent and that said Letters Patent is hereby corrected as shown below:

<u>Column 4,</u>
Line 24, replace "coats of a polymer material" with -- coats of a silicon based sprayable polymer material --.
Lines 43 and 49, replace "desired part" with -- desired plastic part --.
Line 45, replace "part" with -- plastic part --.

Signed and Sealed this

Twenty-third Day of May, 2006

JON W. DUDAS
*Director of the United States Patent and Trademark Office*